Aug. 23, 1960  W. A. HORTON  2,950,362
ELECTRICAL CIRCUIT AND SWITCH ASSEMBLY THEREFOR
Original Filed May 23, 1957  2 Sheets-Sheet 1

INVENTOR
WILLIAM A. HORTON
BY
ATTORNEYS

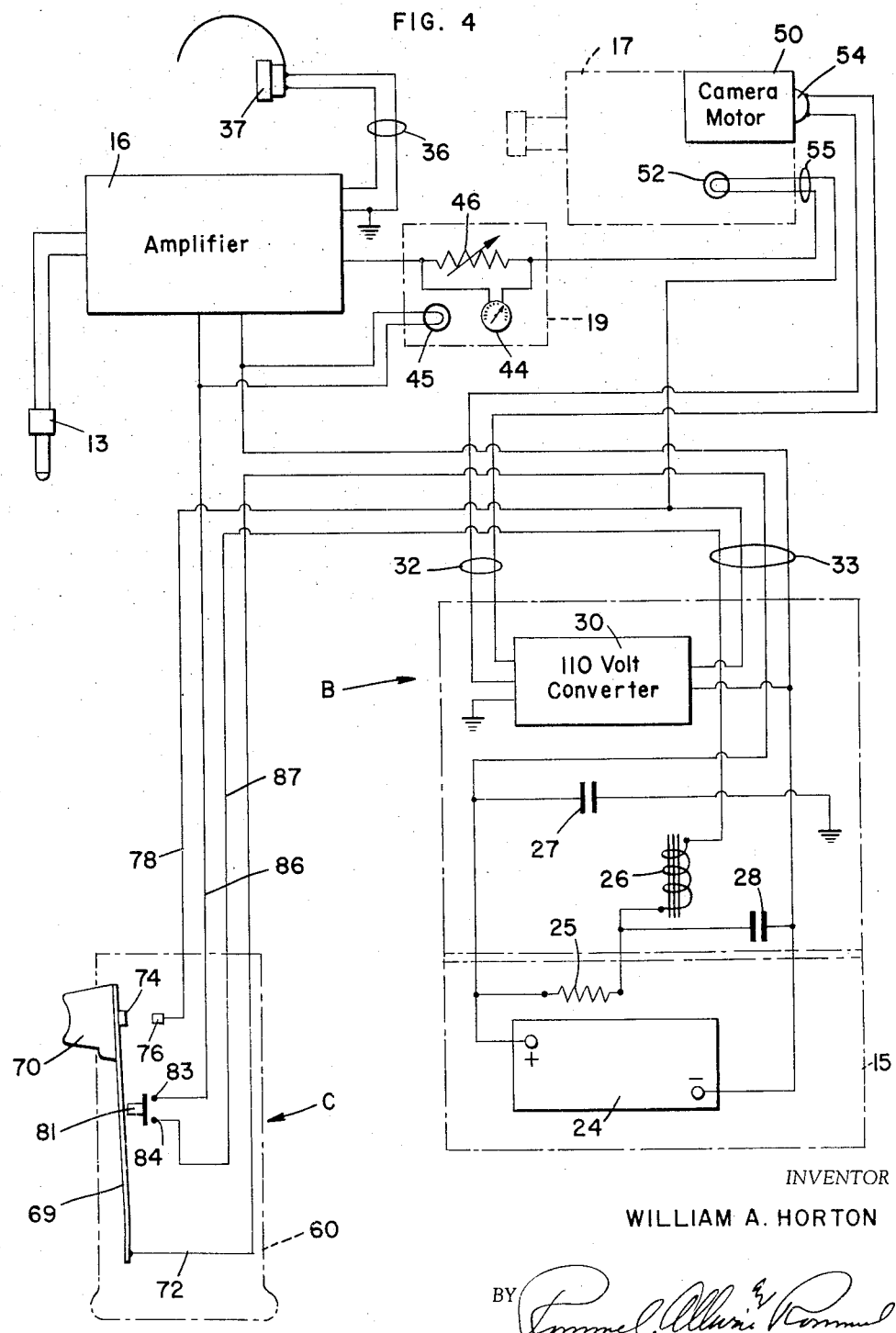

United States Patent Office 2,950,362
Patented Aug. 23, 1960

2,950,362

ELECTRICAL CIRCUIT AND SWITCH ASSEMBLY THEREFOR

William A. Horton, % Southwest News and Photo Service, 4335 Circle Drive, Oklahoma City, Okla.

Original application May 23, 1957, Ser. No. 661,082, now Patent No. 2,873,645, dated Feb. 17, 1959. Divided and this application Sept. 12, 1958, Ser. No. 760,612

2 Claims. (Cl. 200—1)

This invention relates to improvements in electrical circuits and switch assemblies and more particularly to improvements in electrical circuits and switch assemblies for use with portable sound recording moving picture apparatus such as is disclosed in my co-pending application Serial No. 661,082, filed May 23, 1957, which is now Patent No. 2,873,645, issued Feb. 17, 1959, this application being a division of my co-pending application Serial No. 661,082.

The primary object of this invention is to provide a switch assembly that will, when moved into a first position actuate a first electrical circuit, and will, when moved into a second position actuate both the first circuit and a second circuit.

A further object is the provision of a trigger switch that eliminates the "howl" normally occurring at the beginning and ending of a film sound track recorded simultaneously with the taking of the picture. It has been found that the "howl" in ordinary sound picture taking is caused by having the sound recording light at full intensity before the camera is started, with the result that the sound is distorted as the camera picks up speed. When these "howls" occur in sound film, it is necessary to edit them out and to cut and patch the film, thus consuming a great deal of time. When minutes are important, as for instance, in getting a film ready for a certain scheduled TV program, this delay is extremely vexing. Also it is extremely important, in taking sound pictures, to be able to take a scene or a speech for a short time, shut down the camera for a short time, take another strip of film and sound to get, for instance, the point a speaker is making without having to take the entire speech, and then be able to put this directly onto a TV screen, showing it as a smoothly flowing picture while actually it is a condensed or fragmentary version of what occured or what was said. In prior sound recording motion picture apparatus the elimination of this howl was unavoidable, as the operator had to first turn on the sound recording light in order to regulate the audio, according to the distance of the sound source from the microphone, the volume of the sound, etc., and then the switch operating the camera would be actuated, with resultant distortion of sound. Experiments have shown that when the sound recording light and camera motor are actuated simultaneously it requires approximately the same length of time, one-half second, for the camera to reach maximum speed and for the sound recording light to reach maximum intensity, thus, recording sound and picture together as the camera reaches maximum speed. In the novel switch assembly herein provided a two-stage switch is provided to attain this desirable result. The trigger is initially pressed for a short distance, into a first position, the amplifier and sound coil are actuated but not the sound recording light, and the sound properly adjusted by the audio controls. The trigger is then depressed further to a second position at which time the sound recording light and camera are actuated simultaneously and the picture and sound recording are made. The sound recording light thus reaches maximum intensity at the same time as the camera reaches maximum speed, eliminating the unwanted "howl." When the trigger is released sound recording is stopped and only one frame, or one twenty-fourth second, is required for the light to go out and the camera and sound recording light will stop at the same time.

A further object is the provision of an improved electrical system for the elimination of converter hum from portable sound moving picture apparatus.

Other objects and advantages of this invention will be apparent during the course of the following detailed description.

In the accompanying drawings, forming a part of this specification, and wherein similar reference characters designate corresponding parts throughout the several views:

Fig. 4 is a schematic diagram of the electrical circuit and switch assembly.

Figure 1:
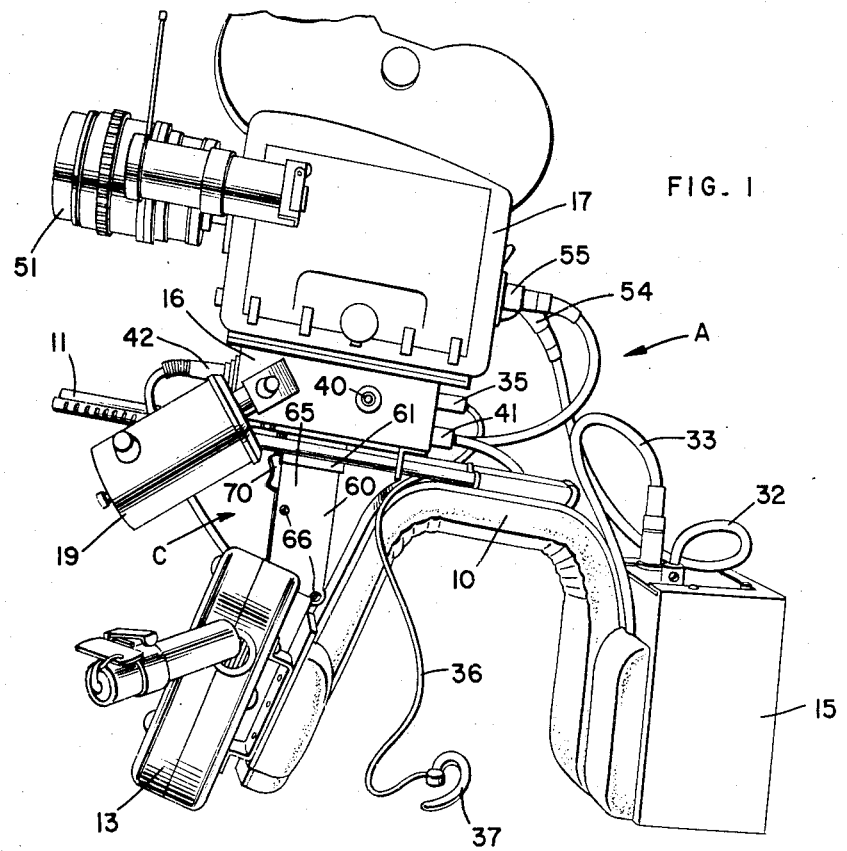
Fig. 1 is a perspective view of the improved portable sound recording moving picture apparatus of my co-pending application Serial No. 611,802, showing the location of my improved trigger switch assembly when utilized in conjunction with this apparatus.
Figure 2:
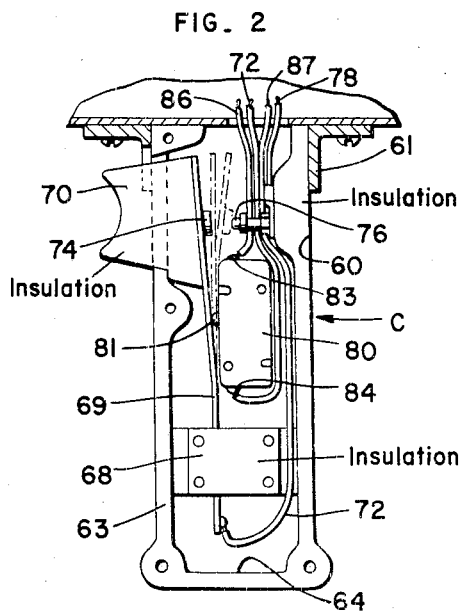
Fig. 2 is an enlarged vertical sectional view taken through the trigger switch assembly of Fig. 1.
Figure 3:
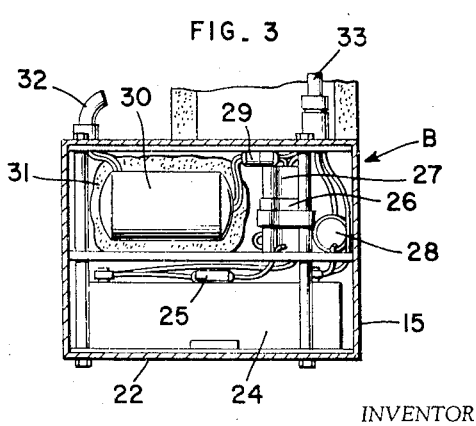
Fig. 3 is a vertical sectional view taken through the power source of the apparatus shown in Fig. 1.

In the drawings, wherein for the purpose of illustration is shown a preferred form of the invention, the letter A may generally designate the improved portable sound recording moving picture apparatus disclosed in my co-pending application above mentioned; B my improved electrical circuit for the elimination of converter hum; and C my improved switch assembly.

The portable sound recording moving picture apparatus A generally comprises a shoulder saddle or bracket 10 for the support of the entire apparatus upon the operator's shoulder; a camera support 11 mounted upon the uppermost portion of the shoulder saddle 10; a microphone unit 13 mounted upon the foremost portion of the shoulder saddle 10; a power source 15 mounted upon the rearmost portion of the shoulder saddle 10; an amplifier 16 and a sound recording motion picture camera 17 mounted upon the camera support 11; and a visual sound indicating meter 19 mounted upon one side of the amplifier 16.

My improved electrical circuit B includes, mounted within the casing 22 of the power source 15, a storage battery 24, resistor 25, coil 26, condensers 27 and 28, quick detachable coupling 29, and 110 volt converter 30. The resistor 25, coil 26 and the two condensers 27 and 28 are provided within the electrical system to eliminate the 60 cycle hum from the 110 volt converter which would otherwise be transmitted to the sound track of the film. The entire apparatus contained within casing 22 may be packed in sponge rubber 31 so that any vibrations suffered by the apparatus will not be directly transmitted to the power source. Electrical outlet lines 32 and 33 lead from the power source 15 to the camera 17 and amplifier 16, respectively.

The amplifier 16 is preferably a standard transistor amplifier which amplifies and transmits the sound from the microphone unit 13 to the camera 17. An earphone outlet may be provided in the amplifier to receive an earphone jack 35 to which is attached a cord 36 and an earphone 37. The amplifier 16 is provided with a standard control 40 for adjusting the intensity of the sound track lamp according to the emulsion type of film used. The amplifier 16 is also provided with a collar 41 which receives the power supply line 33, and a connection for the microphone jack 42 so that the sound will be transmitted from the microphone unit 13, through the amplifier 16, to the camera 17.

The visual sound indicating meter 19 is of the standard type including a reading face 44 which indicates both the volume and the exposure of the sound track to the sound recording light; a meter face illuminating light 45; and a gain control 46 for regulating the volume of sound transmitted to the sound recording coil or regulator of the camera.

The camera 17 is a standard sound recording motion picture camera such as the Auricon Cine-Voice camera, manufactured by Berndt-Bach, Inc., Hollywood, California, and includes the conventional mechanism necessary for the taking of motion pictures and sound tracks, including a camera motor 50, lens 51, and a sound recording light 52. The camera 17 is provided with two outlets into which are plugged jacks 54 and 55 leading to the power source and amplifier, respectively.

The trigger switch assembly C preferably comprises a pistol grip casing 60 that is secured to the undermost surface of the amplifier 16 as by the bracket 61. This casing 60 is an electrical insulator, made from any material that is a non-conductor of electricity, and is of a conventional configuration, having a receptacle portion 63 defining a chamber 64 within which the switch operating mechanism is received, and having a cover plate 65 secured upon the receptacle portion 63 as by screws 66. Disposed within the chamber 64, and secured to the walls of the receptacle 63, is an insulated housing 68, to which is secured a resilient metal arm or strip 69 that supports a trigger 70. A power supply line 72 is secured to the lowermost end of the strip 69, leading to the power supply 24.

An electrical contact 74 is provided on the strip 69, opposite the trigger 70, for engagement with a contact 76 that is mounted within the chamber 74 of the receptacle 63. An electrical line 78 leads from the contact 76 to the 110 volt converter 30 and exposure lamps 52. A micro switch 80, having a switch contact 81 adapted to be actuated by the strip 69, is provided within the chamber 64. Outlets 83 and 84 are provided upon the micro switch 80, the outlet 83 having an electrical line 86 leading to the amplifier 16 and indicator light 45, and the outlet 84 having an electrical line 87 leading to the storage battery 24.

The operation of the device is as follows:

The microphone unit 13 is held by the speaker, the earphone 37 placed upon the cameraman's ear, the camera sighted and the trigger 70 pressed into its first position. By first position I mean that the trigger 70 is depressed so that the strip 69 presses against the switch contact 81, actuating the micro switch 80. The trigger 70 is not depressed to such an extent that the contacts 74 and 76 will meet, so that when the switch is in this first position only the micro switch 80 is actuated.

Upon the actuation of the micro switch 80, 12 volt power is supplied to the amplifier 16 and the voice coil and audio controls are adjusted by the camera operator. Power is not supplied at this point to the sound recording lamp 52 and the camera motor 50. The volume may then be controlled by the gain control 46 and the amplifier warmed up without actuating the camera and the sound recording light.

After the sound has been regulated by the control 46, the trigger 70 is then depressed to a second position, at which time the contacts 74 and 76 will become engaged and the sound recording light 52 and the camera motor 50 will be actuated. The operator has completed, by the simple task of actuating the trigger, three separate operations: (1) applied sound to the voice coil, (2) turned on the exposure lamp, and (3) started the camera to roll. This simple movement of the trigger also eliminates the possibility of the camera being turned on inadvertently, leaving the sound track exposure off while taking pictures only, while the cameraman believes that he is getting sound with his pictures, whereas in reality he is not.

I have thus provided a trigger switch assembly for the elimination of the "howl" which occurs when the sound recording light is turned on prior to the actuation of the film and have provided for adjustment of the volume prior to the turning on of the camera and sound recording light, so that both the camera and the sound recording light start at the same instant, and both reach maximum speed and intensity, eliminating the "howl" that ordinarily accompanies the initial actuation of sound recording motion picture apparatus.

Various changes in the shape, size and arrangements of parts may be made to the form of invention herein shown and described without departing from the spirit of the invention and the scope of the following claims.

I claim:

1. A two-stage switch assembly for the activating of sound recording moving picture apparatus, comprising a casing, a switch operating and contact arm flexibly mounted within said casing, said arm being an electrical conductor and forming a portion of a first circuit, a terminal of said first circuit connected to said arm, a contact point mounted on said arm, a second contact point mounted within said casing and forming a second terminal for said first circuit, whereby upon movement of said first mentioned contact point into abutment with said second contact point said first circuit will be closed between said first mentioned terminal and said second terminal through said arm, a switch mounted within said casing for actuation of a second circuit, said switch including a dielectric switch actuator mounted in juxtaposition for actuating contact by said arm prior to abutment of said first mentioned contact point and said second contact point, said arm comprising a spring member tensioned to open said first and second circuits by spring action, a stop for abutment with said spring member extending longitudinally of and intermediate the length of said spring member, said dielectric switch actuator extending above the plane of abutment of said spring member and said stop for actuating contact by said spring member prior to abutment of said spring member with said stop, and said second contact point being mounted below the plane of abutment of said spring member and said stop, so that as said spring member is depressed said dielectric switch actuator will be contacted and said second circuit actuated, and then said stop will be engaged, providing a positive indication that only one of said circuits has been closed and the other remains open, the further depression of said spring member below the plane of abutment of said spring member and said stop bringing said first mentioned contact point into abutment with said second contact point and closing said first circuit.

2. A trigger switch assembly as specified in claim 1 wherein the body portion of said switch comprises said stop.

References Cited in the file of this patent

UNITED STATES PATENTS

| 2,347,325 | Kirschbaum | Apr. 25, 1944 |
| 2,407,509 | Oetzel | Sept. 10, 1946 |
| 2,609,525 | Gemmill | Sept. 2, 1952 |
| 2,626,320 | Bergson | Jan. 20, 1953 |
| 2,806,907 | Mazzola | Sept. 17, 1957 |
| 2,851,971 | Campbell | Sept. 16, 1958 |